United States Patent [19]

Chang

[11] Patent Number: 4,511,690

[45] Date of Patent: Apr. 16, 1985

[54] REINFORCED COMPOSITES

[75] Inventor: Ike Y. Chang, West Chester, Pa.

[73] Assignee: E. I. Du Pont de Nemours and Company, Wilmington, Del.

[21] Appl. No.: 618,117

[22] Filed: Jun. 7, 1984

[51] Int. Cl.$^3$ ................................................ C08K 3/04
[52] U.S. Cl. .................................... 524/606; 525/432
[58] Field of Search ....................... 524/606, 495, 496; 525/432

[56] References Cited

U.S. PATENT DOCUMENTS

| | | | |
|---|---|---|---|
| 3,393,210 | 7/1968 | Speck | 524/606 |
| 3,583,147 | 6/1971 | Brizzolara et al. | 525/432 |
| 4,399,246 | 8/1983 | Hyde | 524/606 |

Primary Examiner—Lewis T. Jacobs

[57] ABSTRACT

Composites comprising homopolymer from bis(para-amino cyclohexyl)methane and dodecanedioic acid reinforced with 50 to 70% by volume of graphite or p-aramid filaments.

3 Claims, No Drawings

REINFORCED COMPOSITES

BACKGROUND OF THE INVENTION

Homopolymer from bis(para-amino cyclohexyl)methane (PACM) and dodecanedioic acid (12) is disclosed in U.S. Pat. No. 3,393,210. It (PACM-12) is disclosed therein as useful in the manufacture of melt-spun yarns as well as for casting molding and thermoforming operations in general. The use of PACM-12 as matrix polymer for glass and asbestos fiber reinforced molded structures is also suggested in the patent. Unfortunately, composites from PACM-12 and glass fiber exhibit very low flex and interlaminar shear strength. It has now been found that graphite and p-aramid fiber behave quite differently as the reinforcing component in such composites.

SUMMARY OF THE INVENTION

This invention provides a composite comprising a matrix formed of the homopolymer from bis(para-amino cyclohexyl)methane and dodecanedioic acid reinforced with from about 50 to 70% by volume of continuous filaments selected from the group of graphite and p-aramid filaments. Preferably the homopolymer has a relative viscosity of at least 35 measured as described herein and more preferable from 40 to 100% of the homopolymer is in the trans-trans form.

DETAILED DESCRIPTION OF THE INVENTION

Preparation of the PACM-12 is fully described in U.S. Pat. No. 3,393,210. The homopolymer may be obtained at different trans-trans (tt) levels and relative viscosities by techniques well-known in the art.

The continuous filament reinforcement used with this invention are graphite or p-aramid filaments. In the examples below, the graphite fiber used is Magnamite graphite fiber Type As4, a high-strength PAN-based fiber produced by Hercules Incorporated. The p-aramid filaments employed in the examples are finish-free poly(p-phenylene terephthalamide) filaments in the form of 1400 denier, 1000 filament yarn.

The composites may be prepared by any of a great variety of techniques. Thus, the fiber may be combined with matrix by solution coating of PACM-12; by cowinding filaments of PACM-12 with graphite or p-aramid filaments into a sheet and melting the PACM-12 filaments to form the matrix; by depositing PACM-12 powder on a warp of graphite or p-aramid filaments and melting to provide matrix; by extruding molten PACM-12 onto a warp of the reinforcing filaments or by applying a film of PACM-12 to both sides of a warp of the reinforcing filaments to make a sandwich which under heat and pressure forms a reinforced sheet. A plurality of such sheets can be stacked and formed under heat and pressure into a shaped reinforced structure.

From about 50 to 70 volume percent of reinforcing filaments are normally employed in the composites to achieve maximum properties. The graphite/PACM-12 composites have surprisingly high fracture toughness and impact resistance. The p-aramid/PACM-12 composites have excellent flexural and shear properties.

The composites of this invention are unusual in several respects. Unlike many other resins in use, PACM-12 offers many advantages. It has a low density which enhances its desirability for use in the aerospace industry where weight reduction is important. It also has a relatively high Tg which means that its modulus remains high at higher temperatures than nylon 66 or 2GT which have much lower transition temperatures. PACM-12 is also relatively insensitive to various solvents.

TEST PROCEDURES

Relative Viscosity (RV)—A standard procedure for determining the RV of polymer as described in U.S. Pat. No. 3,511,815 is used. The solvent employed for the determinations herein is a 50-50 mixture of formic acid and phenol.

Flex and Interlaminar Shear Tests:
 ASTM D 790 using a span/depth ratio of 32/1.
 ASTM D 2344 using a span/depth ratio of 4/1 for interlaminar shear.

EXAMPLE 1

This example compares a series of laminates from PACM-12 (70% tt) and graphite with a laminate from PACM-12 and glass fiber with respect to flex and shear properties. In these laminates the filaments run at 0°, 90°, that is at right angles.

Items 1-3 in Table 1 below are composites from plain weave graphite (AS-4) fabrics with PACM-12 matrix applied in film or powder form as indicated. The fabric reinforcement comprised 55% by volume of the composite. The size was removed from the fiber in all items except for Item 3. PACM-12 and graphite filaments (55% by volume) were cowound, as previously described, for manufacture of Item 4. Glass fabric was the reinforcement for Item 5 and constituted 60% by volume of the composite. The RV of the PACM-12 was 68. The reinforcement and polymeric matrix are stacked in alternate layers to make panels 0.10 or 0.20 inches thick after consolidation. Then are heated and pressed for 30 minutes at 300° C. After cooling, test bars of appropriate size are cut from the panels parallel to a principle direction of the reinforcement. Data on the flex modulus, flex strength and interlaminar shear appear in Table 1.

TABLE 1

| ITEM | PROCESS | FLEX MODULUS (K psi) | FLEX STRENGTH (K psi) | INTERLAMINAR SHEAR (K psi) |
|---|---|---|---|---|
| 1 | Fabric/film stacking | 8129 | 118 | 9.4 |
| 2 | Fabric/powder stacking | 7991 | 108 | 9.2 |
| 3 | Fabric/powder stacking | 7081 | 59 | 5.8 |
| 4 | Filament cowinding | 8390 | 118 | 8.8 |
| 5 | Fabric/powder stacking* | 296 | 15 | 2.4 |

*Glass fabric heated at 625° C./2 hours to remove size.

EXAMPLE 2

P-aramid filaments are spread into ribbon-like form and passed under tension across the heated arcuate head of a screw extruder where PACM-12 polyamide (70% tt) of about 70 RV is metered into and through the filaments. A process similar to that disclosed in coassigned concurrently filed application Ser. No. 618,112 filed 6-7-84 is employed. After cooling and winding, the polymer-coated reinforcing filaments are cut to 5.9 inch lengths and a sufficient number of pieces to fill a mold 6.0×0.5 inches to a depth after consolidation of 0.125 inch are inserted in the mold parallel to the length. The mold is preheated to 295°–300° C. a plunger 6×0.5 inch is lowered into the mold, and the material is consolidated at a pressure of 850 psi for 30 minutes. The specimen is then removed from the mold, cooled, and, any excess polymer is trimmed off. Each specimen is measured and weighed to assess density and completeness of consolidation. Properties of the composite specimens are as shown in Table 2.

TABLE 2

| ITEM | PROCESS | % FIBER | FLEX MODULUS (K psi) | FLEX STRENGTH (K psi) | INTERLAMINAR SHEAR (K psi) |
| --- | --- | --- | --- | --- | --- |
| 1 | Extrusion Coating | 62 | 10,000 | 101.3 | 8.0 |
| 2 | Extrusion Coating | 56 | 9,300 | 82.3 | 8.6 |

The term "aramid" is used to designate wholly aromatic polyamides. Not all aramid fibers are useful in the present invention but only those derived from aromatic polyamides whose chain extending bonda are either coaxial or parallel and oppositely directed. High strength, high modulus aramid fibers useful in the present invention may be prepared by the processes described in U.S. Pat. Nos. 3,767,756 and 3,869,430. The fibers are characterized by filament tenacities of at least 18 gpd (15.9 dN/tex) and moduli of at least 400 gpd (354 dN/tex). These fibers are referred to herein as p-aramid fibers. Particularly preferred are p-aramid fibers based on poly(p-phenylene terephthalamide) as produced by Du Pont under the trademark Kelvar ®.

Composite products of the invention also perform surprisingly well in a double cantilever beam test of interlaminar fracture toughness and in a test of compression after impact. The latter indicates the strength of a composite part after impact damage. In such service, the present products out-perform more brittle epoxy composites which are the present standard.

I claim:

1. A composite comprising a matrix formed of the homopolymer from bis(para-amino cyclohexyl)methane and dodecanedioic acid reinforced with from about 50 to 70% by volume of continuous filaments selected from the group of graphite and p-aramid filaments.

2. The composite of claim 1, wherein the homopolymer has a relatively viscosity of at least 35.

3. The composite of claim 1, wherein 40 to 100% of the homopolymer is in the trans-trans form.

* * * * *